United States Patent [19]
Harwood

[11] 3,740,456
[45] June 19, 1973

[54] ELECTRONIC SIGNAL PROCESSING CIRCUIT

[75] Inventor: Leopold Albert Harwood, Somerville, N.J.

[73] Assignee: RCA Corporation, New York, N.Y.

[22] Filed: Apr. 10, 1972

[21] Appl. No.: 242,321

[52] U.S. Cl. ............... 178/5.4 SD, 329/50, 307/232
[51] Int. Cl. ............... H04n 9/50
[58] Field of Search ............... 178/5.4 SD, 5.4 AC, 178/5.4 SY, 69.5 CB; 329/50; 307/232

[56] References Cited

UNITED STATES PATENTS

| | | | |
|---|---|---|---|
| 3,646,362 | 2/1972 | Limberg | 307/232 |
| 3,604,844 | 9/1971 | Ross | 178/5.4 AC |
| 3,651,418 | 3/1972 | Wittmann | 178/5.4 SD |

*Primary Examiner*—Richard Murray
*Assistant Examiner*—F. I. Konzem
*Attorney*—Eugene M. Whitacre and Kenneth R. Schaefer

[57] ABSTRACT

A sample and hold detector arrangement suitable for construction in integrated circuit form as an automatic chroma gain control detector, or a color oscillator AFPC detector, or the like. A wide bandwidth analog multiplier circuit is supplied with an intermittent reference signal and a second signal, the phase or amplitude of which is to be sampled. Pulses produced across the broad-band load are processed by a sample and hold circuit which provides substantially symmetrical bidirectional conduction to a filter capacitor during the sampling interval and a high holding impedance during the remainder of each cycle. A differential switching circuit provides rapid transition between the sample and hold functions.

17 Claims, 3 Drawing Figures

ELECTRONIC SIGNAL PROCESSING CIRCUIT

Figure 1:
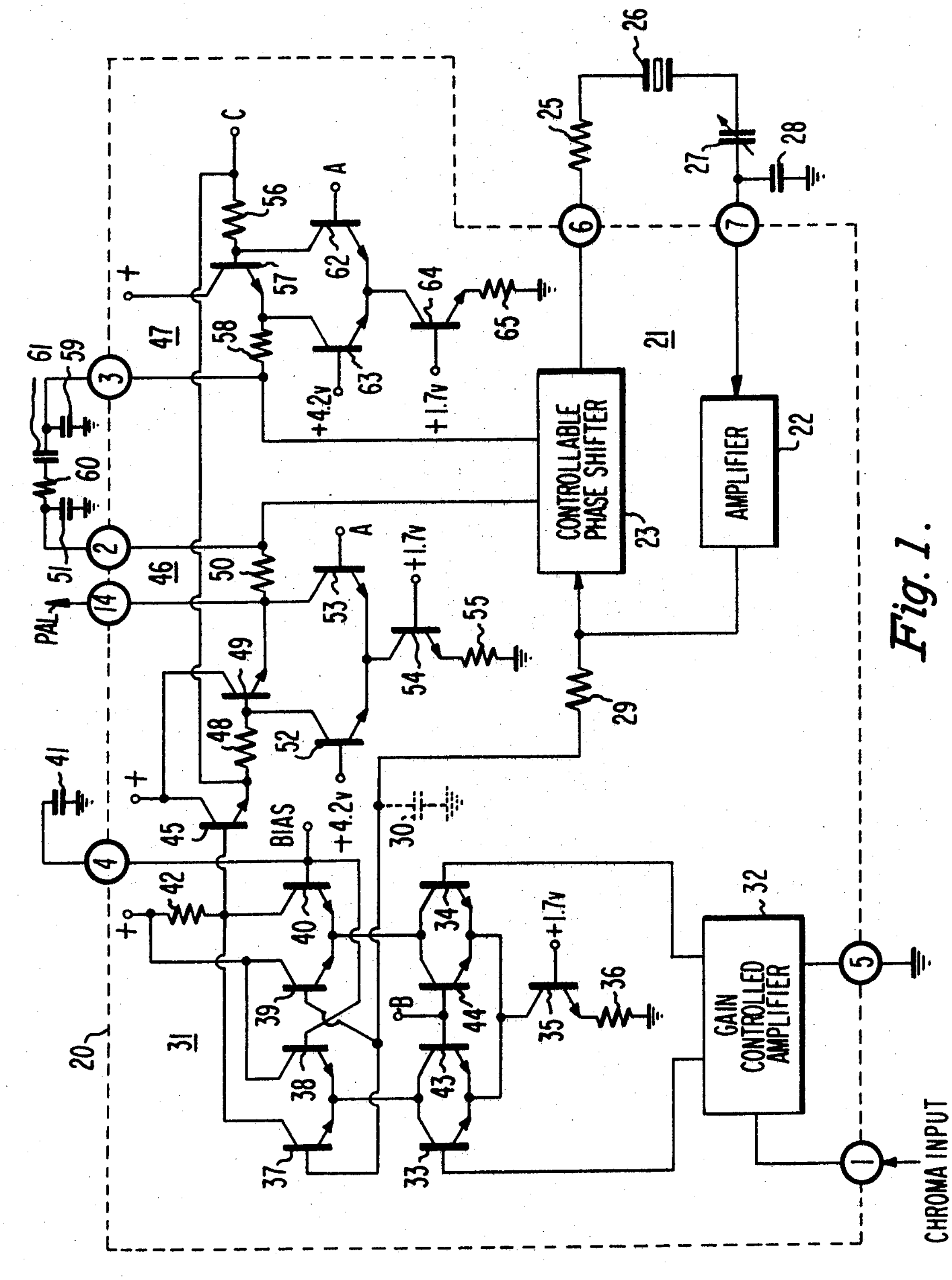

This invention relates to electronic signal processing circuits and, in particular, to circuits of a type which readily may be constructed in monolithic, integrated form and are useful, for example, in color television receivers.

In many different types of electrical apparatus, there is a requirement that a particular characteristic of a signal (e.g., amplitude, relative phase, frequency) be sampled at intervals to provide an output, such as a voltage, representative of the sampled characteristic. In the integrated circuit environment, synchronous sampling or detection often is performed by means of analog multiplier circuits of the type shown, for example, in U.S. Pat. No. 3,629,611 (and the application referred to therein), granted Dec. 21, 1971 in the name of Allen LeRoy Limberg. Typically, such detectors include a resistance-capacitance load circuit having a time constant selected according to the nature of the information to be detected. If the sampling intervals are relatively widely spaced compared to their duration (i.e., a low duty cycle), the detector should provide high gain in order to produce a usable average output voltage across the filter network. Low duty cycle sampling is encountered, for example, in a color television receiver wherein balanced, synchronous detectors are employed for detecting the amplitude and/or the relative phase (as compared to an internal oscillator output) of received color synchronizing burst signals. These synchronous detectors are used to provide automatic chroma control (ACC) and oscillator synchronization (AFPC) signals, respectively.

Under the broadcast standards employed in the United States, which are typical standards for purposes of the present discussion, color burst information is transmitted during a synchronizing interval following the end of each image-representative portion of the signal corresponding to a horizontal scanning line. The color burst consists of eight or more cycles of a waveform having a frequency equal to that of a transmitted color subcarrier (approximately 3.58MHz). A line scanning interval (including image and synchronizing portions) is 63.5 microseconds in duration. The color burst information is present only for a time interval of approximately 2 microseconds and is absent for the remainder (approximately 60 microseconds) of each line scanning interval.

In order to provide the desired high detection gain, previous detectors have employed a combination of an external filter capacitor and a relatively large, external, discrete resistor as the detector load. As is well known, the absolute values of resistors within the integrated circuit are generally not held to close tolerances (e.g., 30 percent variations are typical). Furthermore, thermal characteristics of internal and external resistors are generally dissimilar. It is therefore difficult to produce predictable operating characteristics for integrated circuits employing external gain-determining components unless some provision is made for adjustment of the external components.

As is well known, variable discrete components are relatively costly and, in addition, may necessitate use of one of the relatively few terminals available for connection between circuits inside and outside the confines of an integrated circuit chip. It is therefore generally desirable in the design of integrated circuits to minimize the number of external components associated with such circuits and, in particular to minimize external adjustable or gain determining elements if possible.

In accordance with one aspect of the present invention, the desired predictable, high gain characteristics are obtained from a sampling detector without the need for external load resistors or gain adjustment components. Such a detector comprises a wide-bandwidth multiplier circuit having at least first and second signal input terminals adapted for connection, respectively, to a source of reference signals and to a source of signals having a characteristic which is to be detected. A resistive broad-band load impedance is coupled to an output terminal of the multiplier. The output terminal is coupled to a sampling switching means, the switching means being operable between low and high impedance states for alternately coupling the multiplier output terminal to a filter network and for disconnecting the output terminal from the filter network. In a preferred embodiment, the switching means is bidirectionally conductive and the filter network comprises a series resistor and a capacitor. The resistor is coupled to the switching means such that both charge and discharge (bidirectional) currents associated with the capacitor pass through the resistor.

Apparatus for performing the above described sampling function is of the type commonly referred to as a sample and hold circuit. Some examples of such circuits are shown in U.S. Patent Application Ser. No. 94,889, filed Dec. 3, 1970 in the name of Steven A. Steckler and U.S. Pat. Application Ser. No. 33,336, filed Apr. 30, 1970 in the name of Allen LeRoy Limberg.

In the operation of a sample and hold circuit, a capacitor generally is coupled intermittently to a source of signals which are to be sampled and, between sampling intervals the capacitor stores the sampled information. In order to insure predictable sampling and the desired storage between sampling, the coupling circuit should switch between a predictable charging (sampling) impedance and a relatively high "holding" impedance. Furthermore, where the signal to be sampled may either increase or decrease between sampling intervals, it is desirable that the coupling circuit be capable of either charging or discharging the associated capacitor in a substantially symmetrical manner to insure similar responses to either change in the signal to be sampled. Still further, it is desirable that the transition between the sample and hold modes of operation be relatively rapid to avoid loss of information during the transition.

In accordance with a further aspect of the present invention, a sample and hold circuit arrangement which meets the above-stated criteria is provided. The sample and hold circuit comprises a storage capacitor and switching means for intermittently coupling the capacitor to a source of signals which are to be sampled. The switching means comprises a first transistor having a base coupled to the signal source and an emitter coupled to the capacitor. A differential switching arrangement of second and third transistors is coupled across the base-emitter of the first transistor. The emitters of the second and third transistors are coupled to a current source while the collectors of the second and third transistors are coupled, respectively, to the base and emitter of the first transistor. The third transistor is switched on during the sampling interval while the second transistor is switched off. During the hold interval, the third transistor is switched off while the second is switched on.

Figure 2:
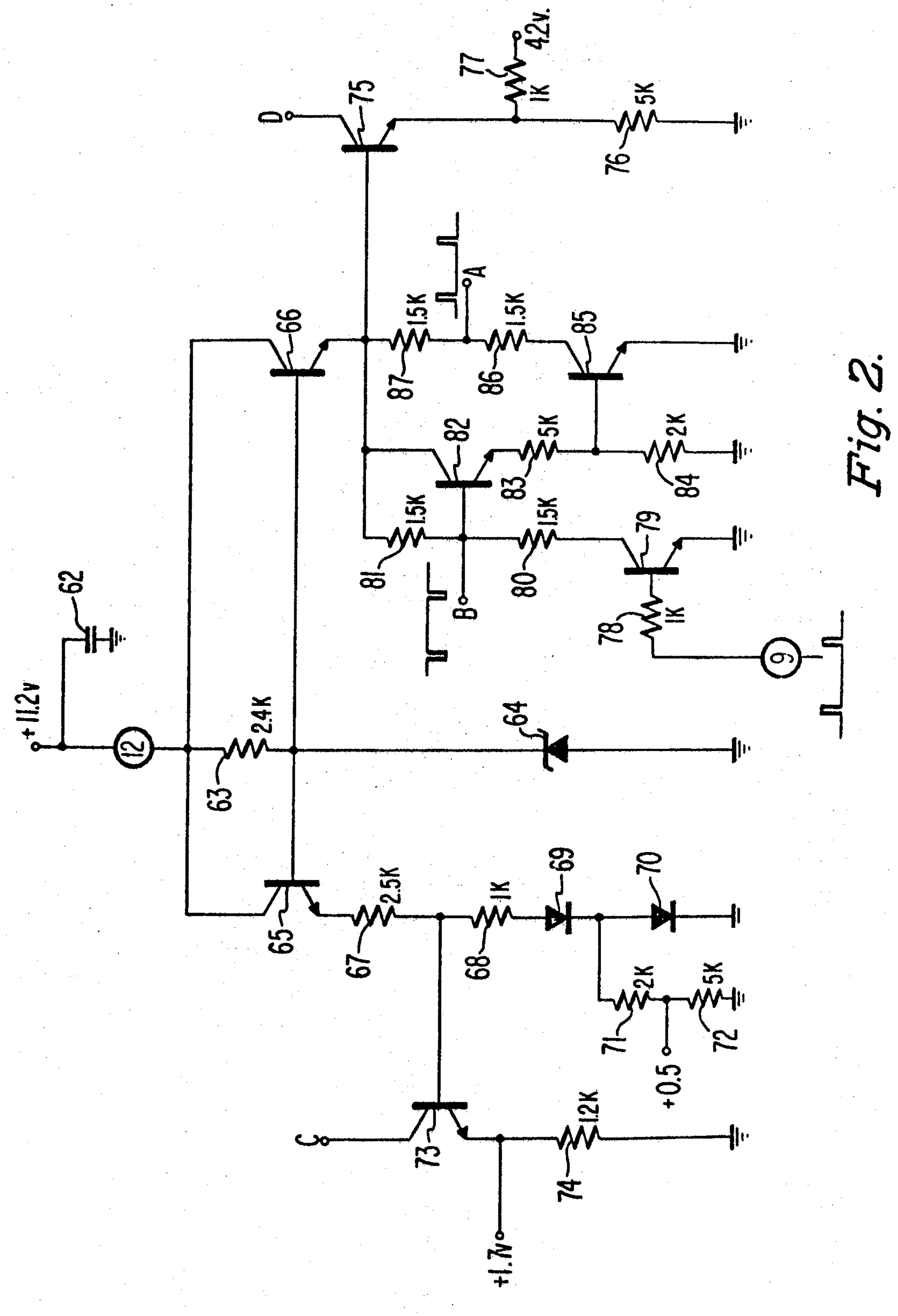
Figure 3:
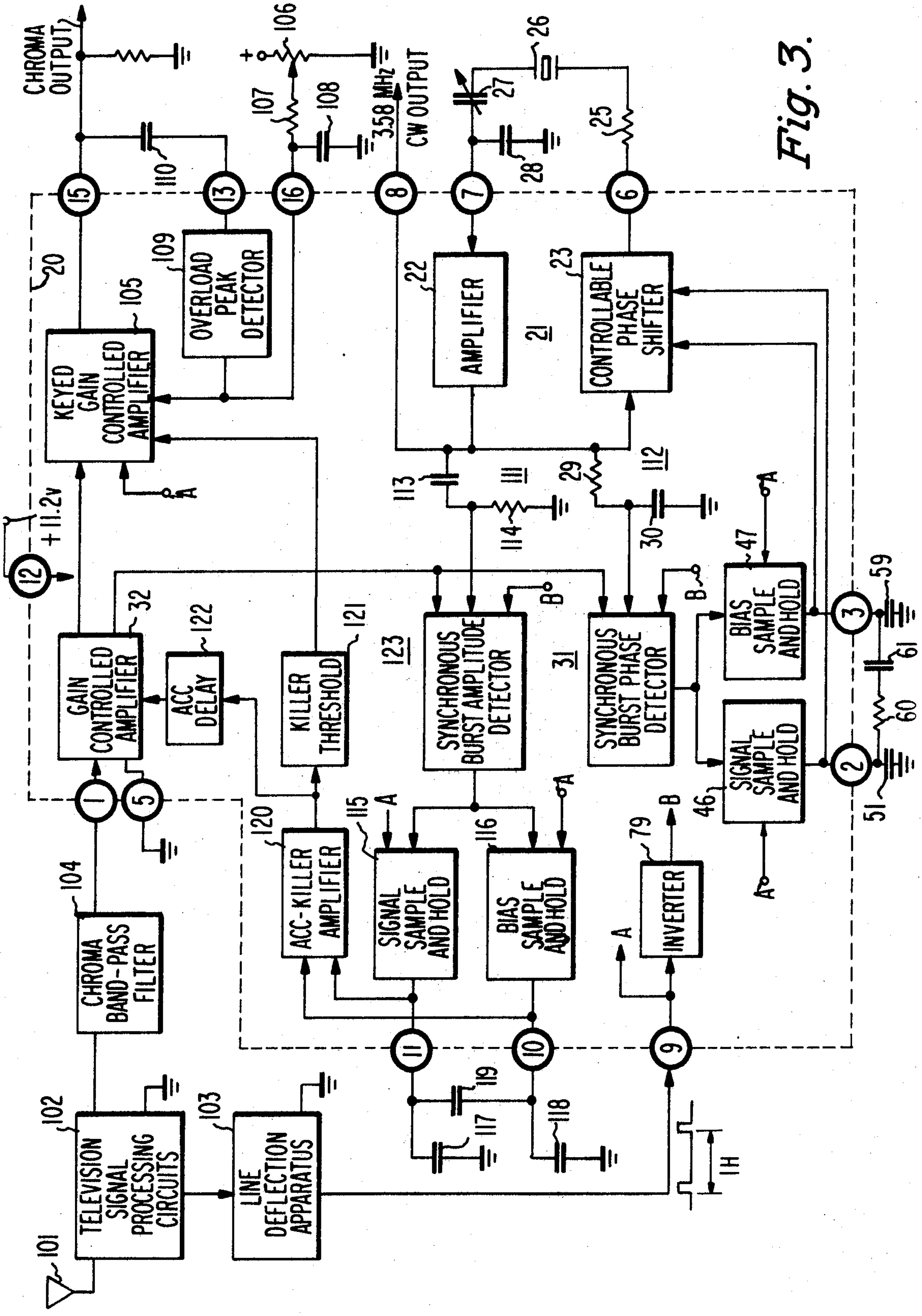

Additional aspects of the present invention will be apparent to those skilled in the art upon a reading of the following description in connection with the accompanying drawing, in which:

FIG. 1 is a detailed schematic representation, partially in block diagram form, of a synchronous detection arrangement constructed in accordance with the present invention;

FIG. 2 is a detailed schematic circuit diagram of operating voltage and current supplies and keying amplifiers which may be used in connection with the arrangement shown in FIG. 1; and FIG. 3 is a block diagram of a portion of a color television receiver, including chroma processing circuitry adapted for construction in integrated circuit form, the chroma processing circuitry being suitable for use of the synchronous detection apparatus shown in FIG. 1 and the additional circuitry of FIG. 2.

Referring to FIG. 1, a balanced, synchronous phase detector, suitable for construction in integrated circuit form on a single chip 20 of monolithic material such as silicon, is shown. The illustrated phase detector may be used, for example, to provide automatic phase and frequency control (AFPC) for an oscillator 21 such as a continuous wave oscillator of the type used for regeneration of a color subcarrier in color television receivers. The illustrated oscillator 21 comprises an amplifier 22 which amplifies and limits signals in the oscillator loop. An output of amplifier 22 is coupled to a controllable phase shift circuit 23. The output of phase shift circuit 23 is, in turn, coupled via a network of discrete, frequency determining circuit components to the input of amplifier 22. The frequency determining circuit components are external to integrated circuit 20 (the confines of which are indicated by the dashed outline) and comprise the series combination of a resistor 25, a narrow-band crystal filter element 26 and a variable capacitor 27 coupled between terminals 6 and 7 of chip 20. A shunt capacitor 28 is also coupled from terminal 7 to a reference potential (e.g., ground). Oscillator 21 is arranged to produce a continuous wave at an output of amplifier 22 at a desired frequency. In the case of a color television receiver, oscillator 21 would be arranged, according to broadcast signal standards of a particular locality, to provide oscillations at a frequency equal to that of the suppressed subcarrier wave associated with the color or chroma signals. For example, in the United States, the chroma subcarrier frequency, and therefore that of the chroma oscillator is generally referred to as 3.58MHz (although the actual frequency is slightly less).

The continuous wave output of oscillator 21 is coupled via a network comprising a series resistor 29 and a shunt capacitance 30, the latter shown in dotted lines, to one terminal of a first pair of input terminals of a balanced, synchronous phase detector 31 of the multiplier type referred to above.

A source of reference signal waves illustrated as a gain controlled amplifier 32 is coupled to a second pair of input terminals of detector 31. In a color television receiver, the source of reference signal waves comprises a first chrominance signal amplifier to which chrominance signal components of a color television signal are applied. For example, as is shown, such chroma signals are applied via terminal 1 of chip 20 and comprise a color image signal component imposed as amplitude modulation at selected phases of a suppressed color subcarrier wave and a color synchronizing burst component. The color burst component typically comprises approximately eight cycles of unmodulated color subcarrier locked in phase with the suppressed subcarrier and transmitted during the synchronizing interval following the end of each line of image information of the transmitted television signal. The chroma amplifier 32 typically is supplied with automatic gain control signals as will be explained below in connection with FIG. 3 and is therefore referred to as a gain controlled amplifier. Push-pull output signals, including the amplitude modulated suppressed subcarrier and burst components, are coupled from amplifier 32 to a second pair of input terminals of detector 31. The second pair of input terminals comprise the base electrodes of a first pair of differentially coupled transistors 33, 34. The emitters of transistors 33 and 34 are joined together and are coupled to the collector-emitter circuit of a transistor 35 arranged in a substantially constant current configuration. To this end, a resistor 36 is coupled between the emitter of transistor 35 and an internal chip reference potential (ground) while a compensated voltage supply (+1.7v) is coupled to the base electrode of current source transistor 35.

A second pair of differentially connected transistors 37 and 38 is coupled to the collector of transistor 33 while a third pair of differentially connected transistors 39 and 40 is coupled to the collector of transistor 34. The bases of transistors 37 and 39 are joined together and are coupled to resistor 29 to provide one of the terminals of the first pair of input terminals of detector 31. The bases of transistors 38 and 40 are also joined together and provide the second one of the first pair of input terminals. In the illustrated embodiment, the joined bases of transistors 38 and 40 are coupled to a substantially constant bias potential ("BIAS") equal to the quiescent potential provided to the bases of transistors 37 and 39. The bases of transistors 38 and 40 are bypassed to ground for signals by means of an external capacitor 41 coupled between chip terminal 4 and ground.

The collectors of transistors 38 and 39 (one from each of the second and third pair) are joined together and are coupled to a source of operating potential (e.g., +11.2 volts). The collectors of the remaining transistors 37 and 40 of the second and third pairs are coupled via a load resistor 42 to the operating potential supply.

Keyed transistors 43 and 44 are coupled, respectively, with their collector-emitter paths in parallel with the collector-emitter paths of transistors 33 and 34. Periodic keying pulses (B) are supplied to the bases of keying transistors 43 and 44 to render transistors 43 and 44 conductive for predetermined intervals and non-conductive for complementary predetermined intervals of each operating cycle. In the case of a color television receiver, transistors 43 and 44 are conductive during the image portion of line scanning intervals to effectively disable transistors 33 and 34 (and therefore remove the effect of the chroma subcarrier input signal components applied thereto). During line synchronizing intervals, transistors 43 and 44 are non-conductive, thereby permitting passage of color burst information to the emitters of the transistors of the second and third pairs 37, 38, 39, 40 via transistors 33 and 34. As is explained in U.S. Pat. Application Ser. No. 89,583 of Erwin Wittmann, such a configuration maintains a substantially constant quiescent potential across output load resistor 42 as transistors 43 and 44 are switched from one state to the other.

Unfiltered output signals produced across resistive load circuit 42 are coupled via an isolating emitter follower transistor 45 to a signal sample and hold circuit 46 and to a bias sample and hold circuit 47.

In the signal sample and hold circuit 46, the emitter of follower transistor 45 is coupled via a resistor 48 to the base of a keyed followed transistor 49. The emitter of keyed follower transistor 49 is, in turn, coupled to a first time constant network comprising a resistor 50 and a relatively small (0.01 microfarad) external filter capacitor 51, the capacitor being coupled between terminal 2 of chip 20 and ground. This first time constant is selected to provide a desired response for synchronization of oscillator 21.

The signal sample and hold circuit 46 further comprises differential switching means having first and second switching transistors 52 and 53 coupled together in a differential arrangement and an associated current source transistor 54. A resistor 55 is coupled between ground and the emitter of current source transistor 54 while a reference bias potential (+1.7v) is coupled to the base of transistor 54. A substantially constant bias potential (+4.2 volts) is coupled to the base of transistor 52. The collector of transistor 52 is connected to the junction of resistor 48 and the base of transistor 49. The collector of the other transistor 53 of the differential signal switching means is connected to the junction of resistor 50 and the emitter of transistor 49. Keying pulses (A), which are inverted compared to those supplied to the bases of transistors 43 and 44, are supplied to the base of transistor 53 and serve to render transistor 53 conductive during the desired signal sampling (e.g., color burst) interval and non-conducting during the remainder of each operating cycle.

The bias sample and hold circuit 47 is similar to signal sample and hold circuit 46 and comprises a resistor 56 coupled between the emitter of follower transistor 45 and the base of a keyed follower transistor 57. A relatively long time constant network comprising a series resistor 58 and an external capacitor 59 (0.1 microfarad) is coupled between the emitter of keyed follower transistor 57 and ground. Capacitor 59 is coupled to chip terminal 3. In a preferred arrangement, resistors 48 and 56 are substantially equal (e.g., 2,000 ohms) and resistors 58 and 50 are substantially equal (e.g., 5,000 ohms). In that case, capacitor 59 is substantially larger than (e.g., 10 times) capacitor 51 to provide the desired relationship of signal and bias sampling time constants. An anti-hunt (damping) network comprising a series combination of a resistor 60 and a large capacitor 61 (10 microfarads) is coupled between terminals 2 and 3. The anti-hunt network is not required for all types of detectors but is useful in the context of color oscillator control to reduce the effect of transient disturbances on the oscillator particularly during the vertical retrace interval when burst information is absent.

The bias sample and hold circuit 47 further comprises differential switching transistors 62 and 63 having their collectors coupled, respectively, to the base and emitter of keyed follower transistor 57 and their emitters joined together at the collector of a current source transistor 64. A resistor 65 is connected between the emitter of current source transistor 64 and ground. A compensated bias potential (+1.7v) is coupled to the base of current source transistor 64. Keying pulses (A) are coupled to the base of switching transistor 62. It should be noted that, in the bias sample and hold circuit 47, transistor 62, to which keying pulses A are coupled, is connected to the base (input) of keyed follower transistor 57. In the signal sample and hold circuit 46, transistor 53, to which the same keying pulses A are coupled, is connected to the emitter (output) of keyed follower transistor 49. As will be explained below, the effect of this different connection is that the signal and bias sample and hold circuits 46 and 47 operate in a complementary manner, i.e., while one is sampling the output of detector 31, the other is off and vice versa. The detailed operation of the system of FIG. 1 will now be described.

The information which is to be detected by the system shown in FIG. 1 occurs during only a portion (i.e., the sampling interval) of each operating cycle. For example, in the case of a color television system, where the phase of the color reference burst is to be detected, the operating cycle corresponds to each line scanning cycle, the burst sampling interval occurring near the end of each such cycle following the transmission of image-representative signals. Sampling pulses (A, B) required for use in such an environment therefore recur at the line scanning rate (approximately 15,750Hz under U.S. standards) and have a duration of the order of 8 microseconds. In order to facilitate the remaining explanation, operation of the circuit will be described in such an environment.

In the quiescent condition of detector 31 (no signals applied and transistors 43 and 44 biased off), the current supplied by current source transistor 35 (typically 1 milliampere) divides substantially equally between similarly biased transistors 33 and 34. Similarly, the collector currents of transistors 33 and 34 divide substantially equally in the succeeding second and third pairs of differential transistors 37, 38 and 39, 40. The collector currents of transistors 37 and 40 are recombined in load resistor 42, the recombined current being substantially one-half the current supplied by transistor 35. A typical quiescent voltage drop across resistor 42 is 2 volts (i.e., resistor 42 typically is 4,000 ohms). With a main operating potential supply of 11.2 volts, the voltage at the base of transistor 45 is approximately 9.2 volts in the quiescent condition. The voltage at the emitter of transistor 45 therefore will be approximately 8.5 volts in this condition (one $V_{be}$ lower).

Assuming, for the moment, that the keying pulse A (representing the occurrence of the synchronizing interval) is present, switching transistors 53 and 62 conduct. The resistors 55 and 65 associated with current source transistors 54 and 64 are selected, for example equal to twice resistor 56. A typical current of 0.5 microamperes flows in each of transistors 54 and 64. These currents pass entirely through transistors 53 and 62 when transistors 52 and 63 are cut off in response to the sampling or keying pulse A. Transistor 57 also is cut off under these circumstances, transistor 62 serving to divert current which would otherwise flow to the base of transistor 57. In the signal sample and hold circuit 46, transistor 49 is conducting, producing a voltage substantially equal to +7.8 volts at its emitter. External filter capacitor 51 will charge towards +7.8 volts via resistor 50 and the switching transistor 53. When the sampling interval ends, transistors 53 and 62 are switched off and, by differential action, transistors 52 and 63 are switched on. After a number of cycles of such operation, capacitor 51 will charge sufficiently so that, when switching transistor 53 is switched off and transistor 52 switches on, the base-emitter voltage of transistor 49 will be of a polarity to cut off (reverse bias) transistor 49. Resistor 48 is selected sufficiently large so that the voltage drop across it produced by the collector current of transistor 52 is sufficient to ensure this reverse bias. Since transistors 49 and 53 are each cut off, the discharge path for capacitor 51 is approximately an open circuit. Therefore capacitor 51 holds its charge until transistors 53 and 49 are again keyed on during the next sampling (burst) interval.

In the bias sample and hold circuit 47, the sampling or keying pulse A is applied to the opposite one of the switching transistors (62) as compared to the signal sample and hold circuit 46. Therefore, capacitor 59, in a manner similar to that described above in connection with capacitor 51, charges during the line scanning interval via resistor 58 and transistor 63 towards the voltage appearing at the emitter of conductive transistor 57. During the burst interval, transistors 57 and 63 are cut off and capacitor 59 holds its charge.

The quiescent voltage at the emitter of transistor 57 is derived from the same circuit point, the junction of load resistor 42 and the joined collectors of detection transistors 37 and 40, as the quiescent voltage at the emitter of transistor 49. Furthermore, the intervening circuit elements (45, 48, 49 in one case and 45, 56, 57 in the other) are substantially identical. In the absence of any input signals to detector 31, these two quiescent voltages, and therefore the quiescent voltages across capacitors 51 and 59 will be equal. Since the sampling interval is relatively short as compared to the time between sampling intervals, there is little danger of noise or other information passing to capacitor 51 during the sampling interval to disturb its quiescent (or error storing) condition. However, during the relatively long line scanning interval, when bias sampling follower transistor 57 is on, either the normal chroma signals or noise can pass through detector 31 and disturb the bias-representative voltage stored on capacitor 59. Therefore, transistors 43 and 44 are keyed on during each line interval, bypassing transistors 33 and 34. Transistors 43 and 44 are substantially identical to transistors 33 and 34 and serve to produce the normal quiescent voltage described above across load resistor 42 during the line scanning interval.

In the normal operation of phase detector 31, therefore, the color subcarrier information supplied by gain controlled amplifier 32 to the bases of transistors 32 and 33 does not appear across load circuit 42. During each burst sampling interval, transistors 43 and 44 are off. Push-pull burst components are applied to transistors 33 and 34 and are compared with the output of oscillator 21 applied to the bases of transistors 37 and 39. As is shown in the drawing, a lagging phase shift, for example, 45° is introduced between the output of oscillator 21 and the input of detector 31 by means of resistor 29 and capacitance 30, the latter being provided by the input capacitance to ground of the bases of transistors 37 and 39. Typically, this capacitance is of the order of 10–12 picofarads which is sufficient in conjunction with a resistor 29 of 2,100 ohms to produce approximately 45° phase shift at the color subcarrier frequency of 3.58MHz.

Detector 31 produces a wide-band output signal across load resistor 42 representative of the phase and/or frequency difference between the applied reference wave from oscillator 21 and the burst component from amplifier 32. Whenever these two signals are equal in frequency and differ in phase at the two inputs to detector 31 by ±90°, detector 31 produces no change in the quescent output voltage across resistor 42 and therefore no change is produced in the quiescent voltage across either capacitor 51 or capacitor 59. The latter voltages are supplied to differential, controllable phase shifter 23 and, since they are equal, produce no change in oscillator phase for frequency. If the oscillator frequency and/or phase is not related to the burst component in this manner, repetitive voltage pulses which vary from the normal quiescent level and are representative of the error are produced across resistor 42. These pulses are produced during each burst sampling interval while an error exists. The polarity of the pulses with respect to the reference level is representative of whether the oscillator phase is leading or lagging the burst component. If the pulse is of a polarity to make the voltage at the base of transistor 45 more positive than the quiescent level (or more positive than a previous error condition), transistors 45 and 49 conduct during the burst sampling interval and charge capacitor 51 via resistor 50 to a correspondingly more positive voltage. The differential, controllable phase shifter 23 produces a corresponding change in phase to reduce the phase (or frequency) error of oscillator 21 towards zero.

If, on the other hand, pulses produced across load resistor 42 are of a polarity to make the voltage at the base of transistor 45 less positive than during a preceding sampling interval, transistors 45 and 49 continue to conduct but, since the emitter of transistor 49 will be at a lower voltage than is stored across capacitor 51, capacitor 51 discharges through resistor 50 and transistor 53, the latter having been rendered conductive during the burst sampling interval as was explained above. An appropriate differential control voltage is therefore applied to phase shifter 23 to reduce the oscillator error towards zero.

Since bias sample and hold circuit 47 is keyed off during each burst sampling interval, the variations in error signal produced across load resistor 42 have substantially no effect on the voltage across capacitor 59. If, however, due to supply voltage variations or other changes in operating conditions, the quiescent condition associated with load resistor 42 changes bias sample and hold circuit 47, as well as signal sample and hold circuit 46 will follow such quiescent changes.

In each case, the filter capacitors 51 and 59 are charged or discharged during their respective sampling intervals by means of like, bidirectionally conductive current paths. In each case, the principal charging and discharging paths during respective sampling intervals includes a resistor (50, 58) and a transistor current supply (49 or 53 in one case and 57 or 63 in the other). The illustrated arrangement therefore responds to error signals of either polarity with substantially equal facility.

Referring to FIG. 2, operating voltage and current supplies and a keying amplifier are shown which are suitable for construction on the integrated circuit chip 20 of FIG. 1. An external, main operating voltage supply of +11.2 volts is connected to chip terminal 12. An external bypass capacitor 62 is coupled from terminal 12 to ground. All of the remaining illustrated components may be constructed within the confines of chip 20. To this end, the series combination of a resistor 63 and a Zener diode 64 is coupled between terminal 12 and ground. Diode 64 is arranged to provide a substantially constant reference voltage of 5.6 volts at the bases of emitter follower transistors 65 and 66, the collectors of which are returned to terminal 12. A voltage divider comprising the series combination of a resistor 67, a resistor 68 and two diodes 69 and 70 is coupled from the emitter of transistor 65 to ground. A further voltage divider comprising resistors 71 and 72 is coupled across diode 70. A transistor 73 is arranged with a base connected to the junction of resistors 67 and 68, an emitter coupled via a resistor 74 to ground and a collector coupled to a terminal "C". As is shown in FIG. 1, terminal C is coupled to the emitter of isolation follower transistor 45 such that transistor 73 provides a substantially constant current drain to maintain transistor 45 in linear conduction over a range of signal variations. A voltage output (+1.7 volts) is also derived from the emitter of transistor 73 for biasing the current source transistors 35, 54 and 64 of FIG. 1.

The emitter of follower transistor 66 is coupled to the base of a further transistor 75. A resistor 76 is coupled from the emitter of transistor 75 to ground so as to provide approximately +4.2 volts at the emitter of transistor 75. A current limiting resistor 77 is coupled between the emitter of transistor 75 and the 4.2 volt output terminal. The latter terminal is coupled to the bases of transistors 52 and 63 in FIG. 1 to maintain such transistors conducting when the associated keyed transistors 53 and 62 are non-conducting.

The keying waveform supplied to chip 20 via terminal 9 is illustrated as including positive-going pulses of relatively short duration (e.g., the burst sampling interval) separated by a relatively longer duration interval (the image-representative portion of the line scanning cycle). The keying waveform is coupled via terminal 9 and resistor 78 to the base of an inverting amplifier transistor 79. A pair of series connected load resistors 80 and 81 are coupled between the collector of transistor 79 and an operating potential (+4.9 volts provided at the emitter of transistor 66). The inverted keying waveform B including negative-going pulses is provided at the junction of resistors 80 and 81 for coupling to transistors 43 and 44 in FIG. 1. The waveform B is coupled to the base of a common collector transistor 82, the emitter load for which comprises series resistors 83 and 84. The base of a further inverter transistor 85 is connected to the junction of resistors 83 and 84. Collector load resistors 86 and 87 are coupled between the collectors of inverter 85 and the emitter of transistor 66. The keying waveform A having positive-going pulses is provided at the junction of resistors 86 and 87 for coupling to the bases of transistors 53 and 62 in FIG. 1.

Referring to FIG. 3, a portion of a color television receiver including a complete chroma processing circuit suitable for construction on the single, monolithic integrated circuit chip 20 is shown. Portions of the chip 20 which are also shown in FIGS. 1 and 2 are indicated by the same reference numerals in FIG. 3. The chroma processing chip 20 is suitable for coupling to the various portions of a television receiver in the manner shown, for example, in RCA Color Television Service Data 1971 No. T8, published by RCA Corporation, Indianapolis, Indiana. That is, the chroma processing chip 20, along with associated external components shown in FIG. 3, serves as a direct replacement for the "Chroma I" module and its associated external components shown in the above-referenced service date.

In such an arrangement, color television signals are received, for example, by means of an antenna 101 and are processed by means of standard color television signal processing circuits, indicated by the block 102. Signal processing circuits 102 comprise, for example, a tuner having radio frequency (R.F.) amplifier and converter stages for amplifying and translating the received signals to intermediate frequency (I.F.) signals. I.F. signals are amplified by means of several amplifier stages including appropriate frequency selective elements and are coupled to a video detector, all within the block 22. Automatic gain control apparatus also is associated with the R.F. and I.F. amplifiers. Synchronizing signal components included in the received signal are separated within block 22 and horizontal (line) deflection synchronizing pulses are coupled to line deflection apparatus 103 in the receiver.

Additional outputs (not shown) such as sound signal components, luminance signal components and vertical deflection synchronizing components are also coupled from signal processing circuits 102 to other portions of the receiver in a well-known manner.

Detected video signals produced at the output of signal processing circuits 102 are coupled to a chroma band-pass filter network 104 arranged to select color-representative signal information contained in the detected video signals. The color representative signals comprise, for example, color difference signal information (R–Y, B–Y, and G–Y) imposed as amplitude modulation at selected phases of a suppressed color subcarrier wave. Band-pass filter network 104 also passes the color burst component which comprises approximately eight cycles of unmodulated color subcarrier transmitted during the synchronizing interval at the end of each line of image information.

The color burst and modulated, suppressed subcarrier waves are coupled from filter network 104 via input terminal 1 of integrated circuit chip 20 to the chrominance signal processing circuitry within the chip 20. The circuitry within the confines of chip 20 (indicated by the dashed outline) comprises a first gain controlled amplifier 32 which serves to controllably amplify both the suppressed subcarrier and burst components of the total signal. The subcarrier component is further amplified and separated from the burst component by means of a keyed gain controlled amplifier 105. Keyed amplifier 105 is enabled during the line scanning interval and is disabled during the synchronizing or blanking interval by means of keying pulses A supplied from line deflection apparatus 103 via terminal 9 of integrated circuit 20. The amplified and separated subcarrier components are made available at terminal 15 ("chroma output") for application to a subsequent chroma demodulator circuit arrangement such as is described in the above-referenced Service Data.

Saturation (color intensity) of images produced on an associated cathode ray picture tube (not shown) is controllable by a viewer by means of a chroma gain control potentiometer 106 coupled across an operating voltage supply ("+"). A variable direct voltage is coupled from the wiper of potentiometer 106 via a resistor 107, a filter capacitor 108 and terminal 16 to keyed amplifier 105. A peak detector circuit 109, operative when the output signals at terminal 15 exceed a predetermined overload level, is coupled between output terminal 15 and a control terminal of keyed amplifier 105 by means of an external capacitor 110 and terminal 13. Details of particular arrangements which are suitable for amplifiers 32 and 105, as well as peak detector 109, are shown in my co-pending U.S. Pat. Application Ser. No. (RCA 65,247).

Chroma processing chip 20 further comprises an oscillator circuit, indicated generally by the reference numeral 21, which is arranged to provide a continuous wave at a frequency equal to that of the received burst component (e.g., 3.58MHz) and in predetermined phase relation with such burst component. Oscillator 21 comprises an amplifier 22, a differentially controllable phase shift arrangement 23 and an external frequency-determining arrangement comprising a series resistor 25, a narrow-band crystal filter 26 tuned to 3.58MHz, an adjustable series capacitor 27 and a shunt capacitor 28. The frequency-determining arrangement 25–28 is coupled between controllable phase shifter 23 and amplifier 22 via terminals 6 and 7 of integrated circuit 20. The desired continuous wave is provided at the output terminal of amplifier 22 and is coupled via terminal 8 to subsequent circuits such as the earlier mentioned chroma demodulator in the receiver.

The continuous wave is also coupled within integrated circuit chip 20 by means of first and second phase shifting networks 111 and 112, respectively, to first and second synchronous burst detection arrangements 123 and 31. Phase shift network 112 comprises a series resistance 29 and a shunt capacitance 30 selected to provide a substantially 45° phase lag at the frequency of the continuous wave. Phase shift network 111 comprises a series capacitance 113 and a shunt resistance 114 selected to provide a substantially 45° phase lead at the frequency of the continuous wave. The detectors 123 and 31 are therefore provided with continuous wave inputs which are in quadrature (90°) phase relationship. Each of detectors 123 and 31 is also supplied with a second input signal—the burst component produced at the output of first gain controlled amplifier 32. Detectors 123 and 31 are keyed off during the line interval and on during the burst interval by means of pulses (B) supplied from line deflection apparatus 23 via terminal 9 and inverter circuit 79.

The second synchronous burst detector 31 is coupled to controllable phase shifter 23 to provide an AFPC (automatic frequency and phase control) loop for oscillator 22 in the manner described above in connection with FIG. 1. Burst phase detector 31 is provided with a single output terminal which is coupled to each of a signal sample and hold circuit 46 and a bias sample and hold circuit 47 as described earlier.

The first synchronous burst detector 123 is operated, as noted above, with a continuous wave input displaced substantially 90° from that applied to burst phase detector 31. Detector 123 therefore operates as an inphase or amplitude detector with respect to the burst component and will be referred to as such hereinafter. Like burst phase detector 31, burst amplitude detector 123 is provided with a single output which is coupled both to a signal sample and hold detector 115 and to a bias sample and hold detector 116. A first, signal time constant network comprising an external filter capacitor 117 is coupled to signal detector 115 via chip terminal 11. A second, relatively long bias time constant network comprising an external filter capacitor 118 is coupled to bias detector 116 via chip terminal 10. A relatively large external capacitor 119 is coupled between terminals 10 and 11.

Detector 123 and sample and hold circuits 115 and 116 operate in a manner similar to that described above in connection with FIG. 1. However, the burst and reference inputs to detector 123 are maintained in phase by operation of detector 31 and associated components. Detector 123 therefore operates as an amplitude detector. The burst amplitude responsive output of detector 115 and the reference bias responsive output of detector 116 are coupled to an automatic chroma control (ACC) and color killer amplifier 120.

A killer threshold circuit 121, coupled to ACC-killer amplifier 120 is arranged to maintain keyed chroma amplifier 105 in an inactive (off) state whenever the detected color burst amplitude is less than a predetermined useful threshold level and to activate chroma amplifier 106 when such threshold is exceeded. An ACC delay network 122 is also coupled to the output of ACC-killer amplifier 120 and serves to maintain a maximum gain operating condition with respect to to first gain controlled amplifier 32 until a predetermined, desired burst component amplitude (and therefore a desired subcarrier component amplitude) is present at the output of amplifier 32. Additional details of operation of the ACC-killer circuitry are included in my copending applications Ser. No. (RCA65,247) referred to above and Ser. No. (RCA 65,241).

Referring again to FIG. 1, in the earlier discussion, operation of the circuit arrangement was described for convenience in connection with color television broadcast standards employed in the United States. The illustrated arrangements also may be used, as will be recognized by persons familiar with the television art, where different broadcast standards are employed. In fact, an additional function can be performed by the detector 31 when employed in a color television apparatus constructed to process signals formulated according to different standards, for example, the PAL standards.

In the PAL system, the R–Y subcarrier component is switched in phase by 180° from line to line at the broadcast encoder. In order to recover this R–Y component, corresponding line to line switching must take place in the decoder (e.g., in a receiver). It is conventional in a PAL color television receiver to switch the reference carrier input to the R–Y demodulator on a line to line basis, the reference carrier switch being driven by a suitably triggered bistable (flip-flop) circuit. Information necessary to identify the appropriate line by line switching is contained in the color burst, the phase of which is alternated predetermined equal amounts leading and lagging a reference phase on a line by line basis. Additional details of the switching identification problem and methods of solving such problems are set forth in U.S. Pat. No. 3,553,357, granted Jan. 5, 1971 to Peter Swift Carnt.

In the circuit arrangement of FIG. 1, when a PAL color signal is supplied via gain controlled amplifier 32 to detector 31, the swinging burst component of that signal will result in alternately positive and negative pulses appearing across load resistor 42 during successive burst intervals. The polarity of such pulses will be indicative of the phase of the burst component and therefore will be indicative of the phase of the R–Y signal component. These pulses will not adversely effect the operation of the oscillator 21, since the line to line average effect of the pulses is zero and can be filtered out at capacitor 51. These pulses are, however, suitable for use in connection with the PAL reference carrier switch referred to above. The keyed synchronous detector 31 produces such pulses with relatively good noise immunity. These pulses may be derived, for example, from the emitter of transistor 49 and, to this end, a terminal 14 on chip 20 is illustrated as providing such a connection.

While the several aspects of the invention have been described in terms of a preferred embodiment, various modifications within the scope of the invention will be apparent to persons familiar with the electronic arts. Component values and other examples of operating parameters have been mentioned only as an aid to understanding the invention and are not intended to be limiting.

What is claimed is:

1. Electronic signal processing apparatus comprising:
a first source of reference signals;
a second source of signals having a characteristic which is to be sampled;
a signal multiplier circuit having at least first and second input terminals coupled to said first and second sources, respectively, and a broad bandwidth load impedance coupled to an output terminal;
a filter network; and
sampling means operable between relatively low and high impedance states for alternately coupling said filter network to said output terminal for sampling said characteristic of said signals and for uncoupling said filter network from said output terminal so as to store information representative of said characteristics at said filter network.

2. Electronic signal processing apparatus according to claim 1 wherein:
said filter network comprises the series combination of a resistance and a capacitance, and
said load impedance comprises a resistance.

3. Electronic signal processing apparatus according to claim 2 wherein:
said signal multiplier circuit comprises first, second and third pairs of differentially connected transistors, each transistor having base, emitter and collector electrodes, the base electrode of one transistor of said first pair providing said first input terminal, the emitter electrode of said transistors of said second pair being coupled together and to the collector electrode of said one transistor, the emitter electrodes of said transistors of said third pair being coupled together and to the collector electrode of the second transistor of said first pair, the base electrodes of first transistors of said second and third pairs being joined together to provide said second input terminals, the collector electrodes of a fist transistor of said second pair and a second transistor of said third pair being joined together and the collector electrodes of the second transistor of said second pair and the first transistor of said third pair being joined together, one of said sets of joined collectors of said second and third pairs being coupled to said output terminal.

4. Electronic signal processing apparatus according to claim 3 wherein:
said sampling means comprises bidirectionally conductive means coupled to said filter network, and
switching means coupled to said conductive means for rendering the latter bidirectionally conductive during each sampling interval and substantially non-conductive during a remaining portion of each operating cycle.

5. Electronic signal processing apparatus according to claim 3 wherein:
said sampling means comprises first, second and third switching transistors each having base, emitter and collector electrodes, the base of said first switching transistor being coupled to said output terminal and the emitter thereof being coupled to said filter network, said second and third switching transistors being differentially coupled together with joined emitter electrodes, the collector of said second switching transistor being coupled to the base of said first switching transistor and the collector of said third switching transistor being coupled to the emitter of said first switching transistor, and a source of sampling signals coupled to at least one of the base electrodes of said second and third switching transistors for rendering said third switching transistor conductive and said second switching transistor non-conductive during each sampling interval and for rendering said second switching transistor conductive and said third switching transistor non-conductive during a remaining portion of each operating cycle.

6. Electronic signal processing apparatus according to claim 5 wherein:
said filter resistance is coupled to the junction of the emitter of said first switching transistor and the collector of said third switching transistor.

7. Electronic signal processing apparatus according to claim 6 wherein:
the base of said first switching transistor is coupled to said output terminal by means of a voltage follower transistor biased to conduction throughout each operating cycle.

8. Electronic signal processing apparatus according to claim 7 wherein:
resistance means is coupled between said voltage follower transistor and said first switching transistor for conducting current to said second switching transistor during said remaining portion of each operating cycle.

9. Electronic signal processing apparatus according to claim 3 wherein:
said first source of reference signals comprises means for generating a continuous wave at a frequency corresponding to the color subcarrier of a color television signal, and
said second source of signals comprises a color television chrominance signal amplifier having an output signal including a periodically recurring color synchronizing burst component.

10. Electronic signal processing apparatus according to claim 9 wherein:
said sampling means is operative to sample a characteristic of said color burst component and to store information representative of said characteristic at said filter capacitance.

11. Electronic signal processing apparatus according to claim 10 wherein:

the sampled characteristic corresponds to the relative phase and frequency of said burst component compared to said continuous wave, and said sampling means includes an additional output terminal coupled to said filter resistance remote from said filter capacitance for providing pulses having a polarity representative of short term phase differences between said continuous wave and said burst component.

12. A sample and hold circuit comprising:

a resistance-capacitance filter circuit;

a source of signals which are to be sampled;

switching means for intermittently coupling said source to said filter circuit, said switching means comprising a first transistor having an input electrode coupled to said source and an output electrode coupled to said filter circuit, differentially coupled second and third transistors having input electrodes, output electrodes coupled, respectively, to said input and output electrodes of said first transistor and common electrodes coupled to a current source, said switching means further comprising a source of sampling signals coupled to at least one of said input electrodes for rendering said third transistor conductive and said second transistor non-conductive during each sampling interval and for rendering said second transistor conductive and said third transistor non-conductive during a remaining portion of each operating cycle.

13. A sample and hold circuit according to claim 12 wherein:

said input and output electrodes of said first transistor correspond, respectively, to base and emitter electrodes, said resistance of said filter circuit is coupled to said emitter electrode, and said first and third transistors are arranged for bidirectional current conduction through said resistance during said sampling intervals.

14. A sample and hold circuit according to claim 13 wherein:

said input electrodes of said second and third transistors correspond to base electrodes, said common electrodes thereof correspond to emitter electrodes and said output electrodes thereof correspond to collector electrodes, and said first, second and third transistors are of like type conductivity.

15. A sample and hold circuit according to claim 14 wherein:

said switching means further comprises a bias voltage source coupled to the base electrodes of one of said second and third transistors, said bias voltage being sufficient to maintain said one transistor conductive during the remaining portion of each operating cycle.

16. A sample and hold circuit according to claim 15 wherein:

said first transistor is switched to conduction in response to said sampling signals during said sampling interval and is switched to non-conduction in response thereto during said remaining portion of each operating cycle.

17. A sample and hold circuit according to claim 16 wherein:

said resistance comprises the sole current path from said switching means to said capacitance during said sampling interval and said current path is substantially open circuited during said remaining portion of each operating cycle.

* * * * *

UNITED STATES PATENT OFFICE
CERTIFICATE OF CORRECTION

Patent No. 3,740,456 Dated June 19, 1973

Inventor(x) Leopold Albert Harwood

It is certified that error appears in the above-identified patent and that said Letters Patent are hereby corrected as shown below:

Column 2, line 30, after "1970" insert -- now U.S. Patent No. 3,715,499 --; line 32, after "1970" insert -- now U.S. Patent No. 3,646,362 --. Column 5, line 2, after "89,583", insert -- now U.S. Patent No. 3,651,418 --; line 13, the portion reading "followed" should read -- follower --. Column 6, lines 56-57, the portion reading "0.5 microamperes" should read -- 0.5 milliamperes --. Column 10, lines 19 and 23, the portion reading "22" should read -- 102 --. Column 11, line 12, the portion reading "(RCA 65,247)" should read -- now U.S. Patent No. 3,740,462 --. Column 12, line 24, the portion reading "106" should read -- 105 --; line 33, the portion reading "(RCA 65,247)" should read -- now U.S. Patent No. 3,740,462 --; line 34, the portion reading "(RCA 65,241)" should read -- now U.S. Patent No. 3,740,461 --. Column 13, line 61, the portion reading "fist" should read -- first --.

Signed and sealed this 26th day of February 1974.

(SEAL)
Attest:

EDWARD M.FLETCHER,JR.
Attesting Officer

C. MARSHALL DANN
Commissioner of Patents